Oct. 5, 1954 P. J. KIRCHER 2,690,853
COFFEE SERVER
Filed May 24, 1952
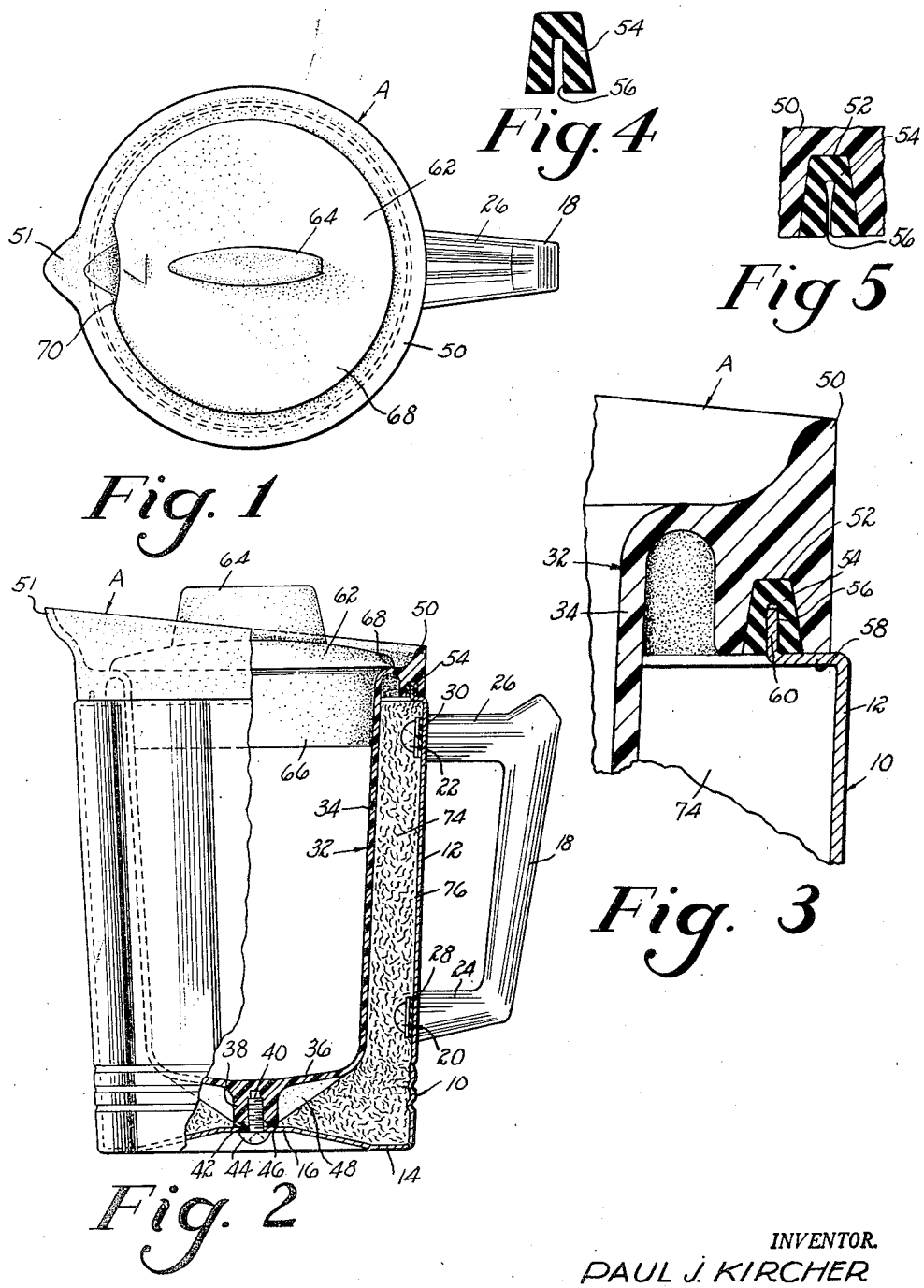
INVENTOR.
PAUL J. KIRCHER
BY
Lindsey and Prutzman
ATTORNEYS Patented Oct. 5, 1954

2,690,853

UNITED STATES PATENT OFFICE 2,690,853

COFFEE SERVER

Paul J. Kircher, Plainville, Conn., assignor to Landers, Frary & Clark, New Britain, Conn., a corporation of Connecticut Application May 24, 1952, Serial No. 289,779

2 Claims. (Cl. 220—15)

1

This invention relates to beverage servers and pertains more specifically to a server for keeping a beverage either hot or cold for an extended period. Accordingly, my invention will find special utility as a coffee server.

One important object of the invention is to provide a server of the above type which is simply constructed and which requires only a few individual parts.

Another object of the invention resides in the provision of a beverage server that may be quickly and easily assembled at the factory and which lends itself readily to the replacement of any part should a part become broken.

Another feature of the invention resides in the provision of a container of this type which permits relatively large manufacturing tolerances.

A further feature of the invention lies in the employment of inner and outer shells having a water-tight seal therebetween to permit immersion of the entire server during washing.

A still further purpose is to provide a beverage server permitting the use of at least two different materials. More particularly, the invention envisages the use of a metallic casing, a plastic liner and, if desired, insulating material therebetween.

Other objects will be in part obvious and in part pointed out more in detail hereinafter.

The invention accordingly consists in the features of construction, combination of elements and arrangment of parts which will be exemplified in the construction set forth and the scope of the application of which will be indicated in the appended claims.

In the drawings:

Fig. 1 is a plan view of the coffee server;

Fig. 2 is a side elevational view, a portion of the outer casing being removed to show the internal construction of the device;

Fig. 3 is an enlarged sectional detail illustrating the fluid-tight seal employed in the invention;

Fig. 4 is a sectional detail of the gasket employed in the seal; and

Fig. 5 is a sectional detail showing the gasket in operative position but before the parts of the server are assembled.

Referring now to the drawings, the coffee server A includes an outer casing or shell designated generally by the reference numeral 10, the outer casing comprising a substantially cylindrical side wall 12 in upstanding relation with a bottom wall 14. For a purpose to be subsequently described, the bottom wall concaves upwardly to form a recess 16. Mounted against the side wall 12 is a handle 18, there being a pair of screws 20 and 22 threadedly received by the horizontal handle arms 24 and 26, respectively. Also, a pair of compressible washers 28 and 30 are used beneath the heads of screws 20 and 22 to preclude the entrance of moisture at these locations.

Concentrically disposed within the outer casing or shell 12 is an inner shell or liner 32 having a substantially cylindrical side wall 34 in upstanding relation with a bottom wall 36. At the center of the bottom wall is an integral lug or protuberance 38 having a threaded aperture 40 extending partially therethrough. The bottom wall 14 has provided therein an aperture 42 in registry with the aperture 40. By this means a threaded screw 44 is utilized to anchor the protuberance 38 relative to the bottom wall 14, there being a compressible washer or gasket 46 between the bottom wall 14 and the protuberance 38 to prevent the entrance of moisture at this point. For purposes of strengthening the bottom wall 36, a plurality of angularly disposed ribs 48 are employed which ribs are integral with the inner shell or liner 32.

The upper end of the inner shell 32 is equipped with a flange 50 having a pouring spout 51 and a downwardly facing, tapered groove 52 extending peripherally therearound. The groove 52 has received therein a somewhat similarly shaped compressible gasket 54 which gasket has a downwardly facing slot 56. As best viewed in Fig. 4, this figure representing the cross-sectional configuration of the gasket 54 before it is pressed into the groove 52, it will be noticed that the gasket is slightly wider than the groove 52. By reason of such dimensioning, the gasket is compressed laterally when inserted into the groove 52 which not only retains the gasket in position but also causes the slot 56 to narrow appreciably when the gasket is urged or pressed into the groove 52, this latter condition being pictured in Fig. 5. The upper end of the outer shell or casing 12 carries an inwardly directed flange 58 which merges into an upwardly directed flange 60, the flange 60 being received in the narrowed slot 56. When the flange 60 is forced into the slot 56 it expands the slot 56 thus placing the gasket under even greater transverse compressive force as best shown in Fig. 3 of the drawings. In this way it will be seen that the flange 50 is substantially flush with the outer surface of the casing 12 and that any fluid, such as that used in washing the server A, would have to traverse a tortuous path about both the flanges 58 and 60, which are tightly sealed by means of the gasket 54 and the press fit thereof caused both by the taper of its outer side walls against the walls of the groove 52 and the compressive effect existing between the sides of the groove 56 and the flange 60. The sealing action is supplemented by the fact that there is a downward pull on the inner shell 32 when the screw 44 is tightened, thereby pulling down upon the flange 50 with the consequent result that the gasket 54 is forced against the upper edge of the flange 60.

Received in the upper opening of the liner 32 is a cover 62 provided with a finger grip handle portion 64. The cover 62 has a downwardly depending flange 66 which is received within the opening of the liner 32, this downwardly depending flange being of smaller diameter than the major diameter of the cover to thereby form a cover supporting lip 68.

Although not shown with particularity, the cover flange 66 may be provided with a cut-out or removed section at 70 which may be rotated into alignment with the spout 51 on the outer liner 12, thus permitting the coffee to be poured without actually removing the cover 62. As shown in Fig. 1, the cover is in pouring position.

As will be seen from an inspection of Fig. 2, the inner and outer shells 12 and 32 are in spaced relation with each other to form a void 74 which not only extends around the side wall 34 but also extends beneath the bottom 36 by virtue of the employment of the lug 38. In this connection it will be observed that liner 32 receives support at only two places, that is by the protuberance 38 and by the flange 50. This results in an extremely sturdy and rugged construction and yet leaves a considerable amount of intervening space above identified as the void 74. This void is preferably filled with an insulating material 76 which may be glass wool, asbestos, or the like. Desirably, the inner shell 32 is molded of a plastic material, such as urea-formaldehyde or phenol-formaldehyde resin. In this way any coffee contained in the server A may be kept at an elevated temperature for a prolonged period.

From the preceding description it is thought that the simplicity and effectiveness of the coffee server will be manifest. Further, the original assembly of the server A requires only the use of a single screw 44 which, of course, renders the disassembly thereof equally simple should the server ever be returned to the factory for repair. Also, it is believed quite apparent that the coffee server may be washed without disassembling the device.

Not only is my server water-tight, made so by virtue of the several gaskets or washers 28, 30, 46 and 54, but the gasket 54 together with the washer 46 permit relatively large axial tolerances in the manufacture of the server, for these elements are compressible to take up any undue clearance that might otherwise exist. In service, the gasket 54 and washer 46 serve additionally in the absorption of external blows or shocks to which the server might accidentally be subjected, thereby cushioning the liner 32 and minimizing any likelihood of its breaking.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A container of the class described comprising inner and outer shells provided with side and bottom walls, the bottom wall of said outer shell being upwardly concave to form a recess in said bottom wall, a downwardly projecting lug on the bottom wall of said inner shell, said lug having an axially extending threaded aperture and said recessed bottom wall having an aperture in registry with said lug aperture, a bolt threadably engageable with said lug aperture, the head of said bolt being accommodated in said recess, the upper end of said outer shell terminating in an inwardly directed flange and an upwardly directed flange on the inner edge of the inwardly directed flange, an outwardly directed peripheral boss at the upper end of said inner shell supported on the inwardly directed flange of said outer shell, said boss having a downwardly facing groove of isosceles trapezoidal cross section and a similarly shaped gasket in said groove provided with a downwardly facing slot for the reception of the upwardly directed flange on said outer shell, said gasket being slightly larger in width at its base than said groove before installation to assure a tight radially compressed fit between the walls of said groove, said gasket and the upwardly directed portion of the flange after installation.

2. A container of the class described comprising an outer shell of thin wall sheet metal construction provided with a recessed bottom and a tubular side wall terminating at the top in an inwardly turned portion forming a peripheral ledge and an upwardly turned flange on the inner edge of the ledge, an inner non-metallic container having a bottom wall and a tubular side wall spaced from the walls of the outer shell and having an enlarged collar portion in the upper end formed with an outwardly flaring inner surface forming an opening to the container, a generally vertical outer surface forming a continuation of the outer surface of the outer shell and a downwardly facing radial surface abutting against the ledge on the outer shell, said collar portion having a downwardly facing annular groove in said radial surface provided with a slotted gasket receiving and embracing the said flange, and tensioning means between the bottoms of the inner container and the outer shell.

References Cited in the file of this patent

UNITED STATES PATENTS

| Number | Name | Date |
|---|---|---|
| 999,672 | Puffer | Aug. 1, 1911 |
| 1,290,378 | Sibley | Jan. 7, 1919 |
| 2,077,216 | Conner | Apr. 13, 1937 |
| 2,349,099 | Kircher | May 16, 1944 |